United States Patent
Vladimirov et al.

(10) Patent No.: US 8,639,818 B1
(45) Date of Patent: Jan. 28, 2014

(54) SYSTEM AND METHOD FOR RELIABLE AND TIMELY TASK COMPLETION IN A DISTRIBUTED COMPUTING ENVIRONMENT

(71) Applicant: Kaspersky Lab ZAO, Moscow (RU)

(72) Inventors: Igor V. Vladimirov, Moscow (RU); Alexander S. Borodin, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/895,146

(22) Filed: May 15, 2013

Related U.S. Application Data

(63) Continuation of application No. 13/851,844, filed on Mar. 27, 2013, now abandoned.

(30) Foreign Application Priority Data

Dec. 25, 2012 (RU) .................................. 2012156428

(51) Int. Cl.
*G06F 15/173* (2006.01)

(52) U.S. Cl.
USPC ............................................ 709/226; 709/224

(58) Field of Classification Search
USPC .................... 709/205, 212–219, 223–226
See application file for complete search history.

(56) References Cited

U.S. PATENT DOCUMENTS

| | | |
|---|---|---|
| 4,980,857 A | 12/1990 | Walter et al. |
| 5,987,621 A | 11/1999 | Duso et al. |
| 6,202,080 B1 * | 3/2001 | Lu et al. ........................ 718/105 |
| 7,020,695 B1 | 3/2006 | Kundu et al. |
| 7,366,859 B2 | 4/2008 | Per et al. |
| 7,451,359 B1 | 11/2008 | Coekaerts |
| 7,661,015 B2 | 2/2010 | Revanuru et al. |
| 7,725,901 B2 * | 5/2010 | Gissel et al. .................. 718/105 |
| 7,934,131 B1 | 4/2011 | Pinheiro et al. |
| 7,958,199 B2 | 6/2011 | Ferrari et al. |
| 8,055,613 B1 | 11/2011 | Mu et al. |
| 8,108,733 B2 | 1/2012 | Richmond |
| 8,209,417 B2 | 6/2012 | Kakarla et al. |
| 8,266,474 B2 | 9/2012 | Goel |
| 8,316,110 B1 | 11/2012 | Deshmukh et al. |
| 8,316,113 B2 | 11/2012 | Linden et al. |
| 8,321,558 B1 | 11/2012 | Sirota et al. |
| 2006/0236324 A1 * | 10/2006 | Gissel et al. .................. 718/105 |
| 2010/0185766 A1 * | 7/2010 | Sano et al. .................... 709/226 |
| 2010/0211829 A1 | 8/2010 | Ziskind et al. |
| 2011/0078303 A1 * | 3/2011 | Li et al. .......................... 709/224 |
| 2012/0023209 A1 | 1/2012 | Fletcher et al. |

FOREIGN PATENT DOCUMENTS

WO  WO2007112245  10/2007

* cited by examiner

*Primary Examiner* — Brendan Higa
(74) *Attorney, Agent, or Firm* — Patterson Thuente Pedersen, P.A.

(57) ABSTRACT

A cluster computing system and method for operating the same for reliable task execution. Token operations are periodically performed by each of the cluster nodes, with each token operation updating an operability metric. In response to completion of the token operation, each of the cluster nodes updates a database containing operability metrics for a plurality of cluster nodes to include each updated operability metric. Each cluster node compares at least some of the updated operability metrics against a benchmark value. In response, each cluster node generates an operability determination as to whether one or more other cluster node is inoperative for carrying out tasks. In response to a determination that one or more other cluster nodes is inoperative, an operative cluster node selects at least one task assigned to one or more inoperative cluster nodes, and executes that task.

21 Claims, 5 Drawing Sheets

SYSTEM AND METHOD FOR RELIABLE AND TIMELY TASK COMPLETION IN A DISTRIBUTED COMPUTING ENVIRONMENT

PRIOR APPLICATIONS

This application is a continuation of U.S. patent application Ser. No. 13/851,844 filed Mar. 27, 2013. In addition, this application claims priority to Russian Federation Patent Application No. 2012156428 filed Dec. 25, 2012, incorporated by reference herein.

FIELD OF THE INVENTION

The invention relates generally to information processing and communications technologies and, more particularly, distributed computing environments, such as cluster computing systems.

BACKGROUND OF THE INVENTION

Computer clustering technologies are used to provide fail-proof operation of computer systems and to complete complex computing tasks. Primarily, the popularity of clusters is explained by the ever-growing number of tasks and by the increasing need to complete them in a 24/7 regime. In the present context, a cluster means a group of physically or logically combined computers, including servers, organized together so that they appear as a single computing resource from the user's perspective.

In order to ensure fail-proof operation, clusters include task re-distribution systems, in which the performance of nodes (computers composing the cluster) is taken into account. In most of today's systems, re-distribution of tasks between the operational nodes of a cluster is handled by task managers. In particular, U.S. Pat. No. 7,661,015 discloses a system for completion of tasks on schedule in a cluster composed of multiple servers. This approach involves a central manager, as well as agents which report the status of the servers to the central manager. Each task is assigned to a specific node; in case of task completion failure, the manager re-assigns the task to another individual computer of the cluster.

U.S. Pat. No. 5,987,621 discloses a mechanism for fail-proof operation of file servers, where a lead server periodically polls other cluster nodes, in order to obtain information on their operability; if an inoperative server is detected, a set of tasks is determined which must be handed over to an operable cluster node in order to be completed. Similar ideas are also described in WIPO Publication No. WO2007/112245A2.

U.S. Pat. No. 4,980,857 discloses a system of work in a distributed computing environment. It proposes a system which includes multiple computer nodes with controllers, devices ensuring fail-proof operation and a task manager. Each node in the proposed solution is assigned a list of tasks it must complete. The status of each node is periodically checked; a node can also send error messages to all cluster members; such messages serve as a basis for determining the parameters for the server under consideration. If any of the servers fails, the task manager re-distributes the tasks between the remaining cluster nodes.

Despite the existing technologies for re-distribution of tasks in case of detection of an inoperative cluster node, there is an issue of ensuring fail-proof operation in case of inoperability of the task distribution manager and in case of absence of an active task distribution manager in a cluster whose nodes have manager functions. For example, U.S. Pat. No. 7,661,015 proposes to track the status of the manager, and, if it is inoperative, to select a new manager from among the operable cluster nodes. In this regard, it should be noted that the manager replacement process can take some time, which is critical when working with a large number of tasks that need to be completed at precisely set times.

Also, during the building of clusters, much attention is paid to the technologies for announcing the inoperability of nodes. In existing systems, for example, in U.S. Pub. No. 2010/0211829 and U.S. Pat. No. 7,451,359, in order to determine operability status, the servers periodically update their status and include a time stamp of the update. However, the use of this approach when working with periodic tasks that have a relatively short completion time, needs enhanced synchronization of the clock inside the cluster, which requires additional resources and costs. In order to resolve this issue, U.S. Pats. No. 5,987,621 and 4,980,857 describe a method where, as time progresses, each cluster node sends signals to other nodes in order to show that it is operable. It should be noted that this solution substantially increases the frequency of communications between the cluster nodes, even with a slight increase in the status update frequency and in the number of cluster nodes; this can cause a delay in signal distribution and, consequently, incorrect interpretation of the cluster node status.

SUMMARY OF THE INVENTION

One aspect of the invention is directed to a cluster computing system that includes a plurality of distinct cluster nodes, each including a set of computing hardware and an operating system. A method for reliable task execution includes the following operations:

Periodically performing token operations by each of the cluster nodes, with each token operation updating an operability metric corresponding to that cluster node. An effectiveness of the update of the operability metric is indicative of timeliness of task execution by that cluster node.

In response to completion of the token operation, updating, by each of the cluster nodes, a database containing operability metrics for a plurality of cluster nodes to include each updated operability metric in the database.

Comparing, by each of the cluster nodes, at least some of the updated operability metrics stored in the database against a benchmark value. The benchmark value is determined from operability metrics stored in the database.

In response to the comparing, generating an operability determination, by each of the cluster nodes, as to whether one or more other cluster node is inoperative for carrying out tasks.

In response to the operability determination being indicative of the one or more other cluster nodes being inoperative, selecting, by a first one of the cluster nodes, at least one task assigned to the one or more inoperative cluster node.

Executing the at least one task by the first one of the cluster nodes in lieu of the one or more inoperative cluster nodes.

Another aspect of the invention is directed to an improved cluster computing system that includes a plurality of distinct cluster nodes, each including a set of computing hardware and an operating system. The improvement includes instructions executable on the computing hardware of each cluster node and stored in a non-transitory storage medium that, when executed, cause the computing hardware of the corresponding cluster node to implement the following:

An operability metric update module that periodically performs token operations, wherein each token operation updates an operability metric corresponding to the cluster node, and in response to completion of the token operation, updates a database containing operability metrics for the cluster node and for a plurality of other cluster nodes to include each updated operability metric in the database. An effectiveness of the update of the operability metric is indicative of timeliness of task execution by the cluster node.

An inoperative node detection module that compares at least some of the updated operability metrics stored in the database against a benchmark value. The benchmark value is determined from operability metrics stored in the database. The inoperative node detection module further generates an operability determination based on a result of the comparison as to whether one or more of the other cluster nodes is inoperative for carrying out tasks.

A task selection module that selects at least one task assigned to the one or more inoperative cluster node in response to the operability determination being indicative of the one or more other cluster node being inoperative.

A task completion module that executes the at least one task in lieu of the one or more inoperative cluster nodes.

Various embodiments of the invention advantageously provide a scalable and fail-proof system for timely completion of tasks in distributed environments, which avoid some of the drawbacks associated with centralized task distribution managers.

BRIEF DESCRIPTION OF THE DRAWINGS

The invention may be more completely understood in consideration of the following detailed description of various embodiments of the invention in connection with the accompanying drawings, in which.

Figure 1:
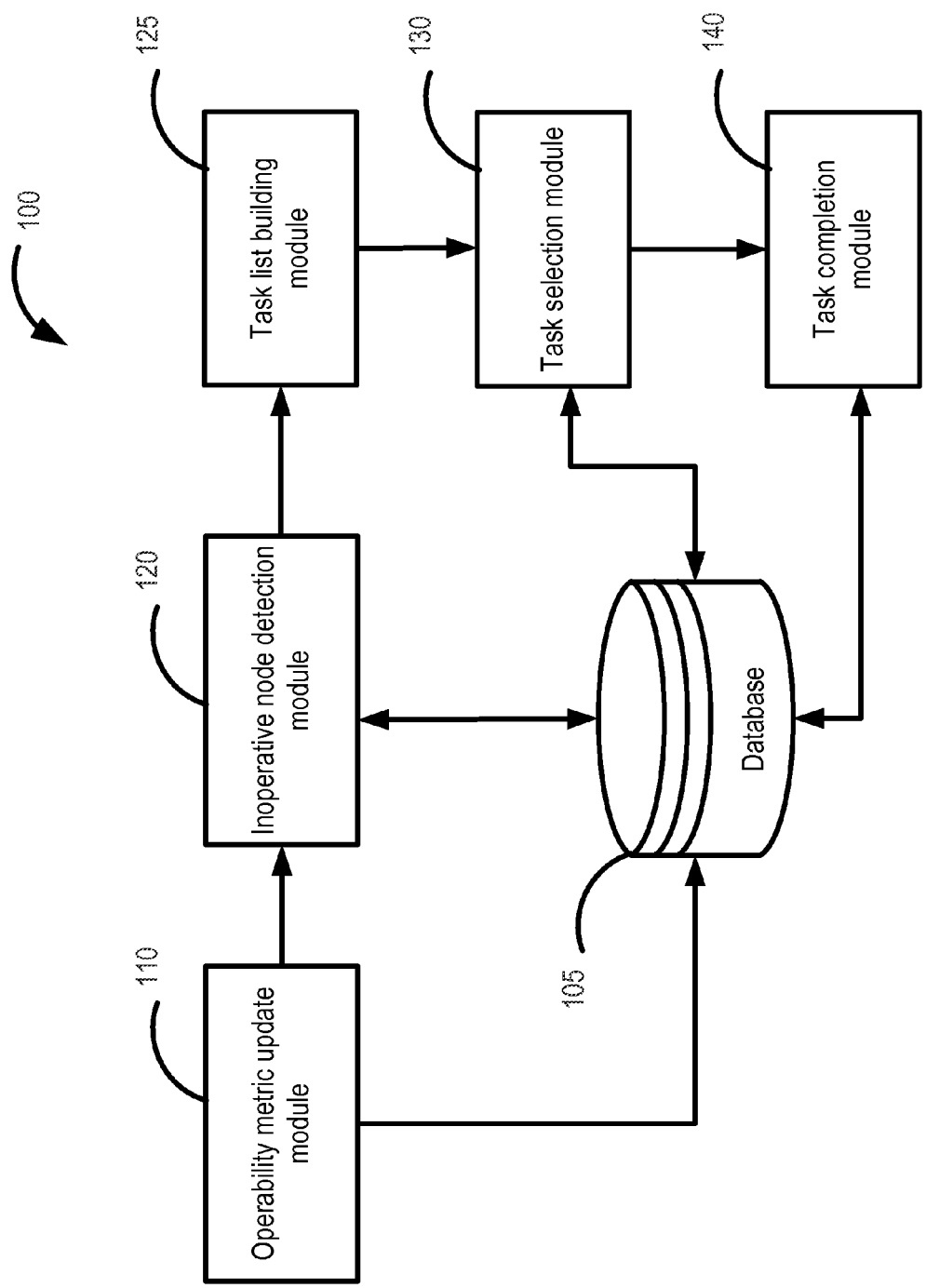
FIG. 1 illustrates a system for reliable and timely completion of tasks in distributed environments according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

One aspect of the invention is directed to ensuring fail-proof completion of tasks, expediently, in distributed processing environments.

Embodiments according to this aspect make use of token operations in order to determine an indication of the availability status of cluster nodes. Related embodiments utilize a de-centralized mechanism for assigning or re-assigning computing tasks for which currently-assigned nodes are burdened to a degree that renders them inoperative (according to defined criteria).

FIG. 1 illustrates a system 100 for fail-proof and timely completion of tasks in distributed environments according to one embodiment. System 100 includes an operability metric update module 110, communicatively coupled with a database 105 and with an inoperative node detection module 120, which also interacts with database 105 and with a task list building module 125. Task list building module 125 sends data regarding the tasks to the task selection module 130, after which the selected tasks are sent to the input of the task completion module 140. It should be noted that, in some embodiments, the task completion module 140 can also receive a task descriptor from the database 105 for correct execution of each task.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, including cluster computing operations, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

In one type of embodiment of the invention, the database 105 is common to (i.e., shared by) all nodes of the cluster, while the operability metric update module 110, the inoperative node detection module 120, the task list building module 125, the task selection module 130 and the task completion module 140 are installed on each node of the cluster.

In a related embodiment of the invention, copies of the database 105 are distributed by cluster nodes in order to ensure fail-proof operation in case of failures in the database 105 itself; this means that the data from the database 105 can be restored at any time if at least one cluster node is operational. Synchronization between the storage units is ensured using any suitable technique, such as those described, for example, in U.S. Pat. No. 8,055,6131, U.S. Pat. No. 7,366,859, and U.S. Pat. No. 7,958,199, the disclosures of which are incorporated by reference herein.

In one embodiment, the operability metric update module 110 of a certain cluster node performs a token operation that serves to update an operability metric corresponding to that cluster node. An operability metric is an indicator that is used to determine a relative measure of the operability (e.g., availability to perform processing) by the cluster node, with respect to that of other cluster nodes. In one type of embodiment, the operability metric can be defined as a measure of timeliness, e.g., in terms of a lag or delay (which is presumed to be caused by excessive workload) or promptness (i.e., lack of lag or delay). The relative measure of operability is observable upon updating of the operability metric via the token operations.

In one embodiment, an operability metric does not directly depend on the current time of day, or, for that matter, on any commonly-used time reference. Thus, there is no requirement for the various cluster nodes to be time-synchronized in order to determine or compare their operability metric values.

In a related embodiment, an element of some ordered set, including a finite one, where some arbitrary operation (e.g., addition) is programmed, can be employed as the operability metric. A set of integer values can be used in one embodiment as the operability metrics for the various cluster nodes.

In some cases, a delay in performing the token operation to update the operability metric is interpreted as inoperability of a cluster node. As will be detailed below, certain embodiments use a thresholding operation to test a degree of delay (i.e., lack of timeliness). If the delay threshold is met or exceeded, a cluster node can be deemed inoperative.

As an example of one embodiment, the operability metric is represented as a counter. In one such approach, the update of the counter is performed iteratively as follows:

1) A token operation is performed that increments the current operability metric counter of the corresponding cluster node. The counter may be stored locally on the cluster node, or remotely on one or more other cluster nodes. Having been incremented, the new value of the operability metric for the node is saved in database 105.
2) Using the operability metric values for all cluster nodes saved in the database 105, the maximum operability metric is determined among those of all the cluster nodes. Each cluster node can perform this determination; or, alternatively, some cluster node(s) may perform this operation on behalf of one or more other cluster nodes.
3) The maximum of the counts obtained at (1) and (2) above is selected. This value is considered to be the peak operability metric for the cluster. This peak value is then used as a benchmark against which the current operability metric for each cluster node is compared.

In one embodiment, all operable cluster nodes periodically perform their token operations to update their operability metric by accessing the operability metric update module 110. In one such embodiment, the frequency of the token operations is the same for all cluster nodes. For example, each token operation can be performed once per second. In another embodiment, each token operation can be performed in response to an occurrence of an idle period lasting some defined duration (e.g., ½ second). This timing relies on local clocks running on each of the cluster nodes; however, as indicated above, there is no requirement that the cluster nodes be time-synchronized with one another (although they may be synchronized for other reasons). This attribute facilitates scalability and reliability in the cluster computing network.

It should be noted that the operability metric update module 110 can be realized using various architectures. In some embodiments of the invention, the operability metric update module 110 is implemented by software instructions executing on the processor of on each of the nodes of the cluster. The operability metric update module 110 of this embodiment periodically performs the token operation to updates the operability metric.

In another type of embodiment, the operability metric update module 110 is implemented on a stand-alone device, or group of devices, which the operable cluster nodes access with a preset frequency as part of their periodic token operations, in order to update the operability metric.

In some embodiments, the frequency of token operations depends on the duration and frequency of completion of the tasks typical for the cluster as a whole or for some of its nodes. For example, in an embodiment utilizing adaptive settings, the average time and the average frequency of completion of tasks for the cluster can be taken into account in determining the token operation frequency to update the operability metric. Thus, if the task execution characteristics change, e.g., if the average time to complete a typical task increases or decreases, then in response, the operability metric update frequency either decreases or increases, respectively. This feature reduces the impact of cluster node operability determination (which itself requires some level of computing capacity, albeit relatively small) on the overall task execution performance of the cluster nodes.

Assessment of the time for completion of a task can be achieved using various approaches, such as those which take into account the statistics of task completion times on different individual cluster nodes. The task completion time can also be determined using information on the average time for completion of similar tasks on similar hardware of other nodes of the cluster. The data on the task completion frequency for the cluster can be obtained from the database 105, which saves information on the tasks being completed and on their completion schedule.

The information on the maximum operability metric value is sent to the inoperative node detection module 120. In one type of embodiment, detection of inoperative nodes is performed by comparing the maximum operability metric for the cluster with current operability metrics of each of the cluster's nodes, and further comparing that difference against a threshold value. If the difference between the current operability metric of a node and the maximum operability metric for the cluster exceeds a that threshold value, then the node is considered to be inoperative. The database 105 can save information on the cluster node operability status, to be used at further stages for related decision-making. One method for detecting inoperative cluster nodes is described in more detail in FIG. 3.

In a related embodiment, instead of determining the maximum operability metric for the cluster to use as the benchmark value, another statistical value is computed, such as an average operability metric value.

Also, in some embodiments of the invention, the inoperative node detection module 120 can take into account the information from a previous iteration when determining whether any nodes are inoperative. Thus, if it was previously determined that the difference between the current operability metric of a node and the maximum operability metric for the cluster does not exceed the preset first threshold value but is close to it, i.e. meets or exceeds an intermediate threshold value (e.g., based on a defined second threshold), then the operability of these nodes can be determined first.

In response to a determination of an inoperative node, various actions may be taken to improve the operation of the cluster computing system. For instance, nodes which themselves recognize that they are inoperative may take actions to avoid being assigned, or taking on, additional tasks to perform. Other responses may include re-distributing already-assigned tasks to other nodes for more timely execution. Similarly, in systems where other nodes may determine the operability status of a particular node, those nodes may take actions to either suppress assignment of tasks to the inoperative node, or to relieve that particular node from already-assigned tasks. Certain approaches are described in greater detail below.

In a related embodiment, the response to determination of inoperative nodes changes dynamically. For instance, in certain cases where the order of task completion is immaterial, it is acceptable to stop searching for inoperative nodes once the first inoperative node is found. In other embodiments, it is required to find all inoperative nodes of the cluster in each operability metric update cycle (i.e., in response to each token operation) or each inoperative node determination cycle (if it is a different cycle).

Combinations are also possible where, for example, all inoperative nodes, as well as nodes having operability metrics that make them nearly inoperative, are identified first. Then, in the next operability metric update cycle, the operability status is checked only for those nodes which were close to the inoperative state last time. The state of all cluster nodes can be re-checked periodically at a frequency which is, for example, divisible by the operability metric update period and by the difference between the first and the second threshold value.

It should be noted that, when there are multiple copies of the database 105, distributed by cluster nodes, for which the process of synchronizing the copies between each other and with the central database 105 is periodically started, it is desirable to take into account the database synchronization frequency in order to correctly determine the threshold values of the inoperability determination threshold or the intermediate threshold.

In one embodiment, the period of synchronization of the copies of the database 105 with the central database 105 and the threshold values for determination of inoperative nodes are interdependent. For example, if it is known that the maximum allowable delay when changes are made to the copy of the database 105 on one of the cluster nodes and their detection on another cluster node is N time units, then the first threshold value used to determine the operability of the cluster nodes must at least exceed N+1. The opposite is also true—if the first threshold value equals M, then the synchronization of the copies of the database 105 must occur at least every M−1 time unit or more often. Here, a time unit means the frequency of operability metric updates.

Upon detection of inoperative nodes, the task list building module 125 selects those tasks from the database 105 which were assigned for the inoperative cluster nodes or for which the executor is not specified. In one embodiment, the complete list of tasks for the cluster under consideration, with information on the executors and the completion frequency, is stored in the database 105.

Then, the task selection module 130 makes a selection of at least one task from the built list which needs to be completed. The selection of the task can be realized using various methods. In particular, a number of factors can be taken into account for example, the task's priority, the resources required to complete the task, the estimated time for completing the task on a computer with similar configuration, and so on. The task selection mechanism is described in more detail in FIG. 4. It should be noted that the completion of the selected task does not have to start immediately; in the general case, the start of a task for completion can be performed in accordance with a preset schedule for the task.

Then, using the task completion module 140, completion of the selected tasks is performed. In order to determine the sequence of the actions when completing a task, a descriptor is saved in the database 105, which the task completion module 140 uses to determine how to perform an action. In particular, the descriptor can represent a scenario described including using pseudo-code technologies, object-oriented or declarative programming languages. Here, a pseudo-code means a set of instructions in a specific order, which must be executed in order to achieve a result; a declarative programming language means specifying what result must be achieved without mentioning the required sequence of actions. In one of the individual embodiments, the descriptor is an instruction or a set of instructions identically interpreted by all cluster nodes—for example, "Create a report on the system's operation".

In one embodiment of system 100, each cluster node periodically updates its operability metric using the operability metric update module 110 and saves it in the database 105, which can be accessed by all cluster nodes; then it determines the inoperative nodes using the inoperative node detection module 120 based on operability metric values for all cluster nodes; then, it finds the tasks that must be completed by the inoperative cluster nodes, and, using the task selection module 130, selects the tasks which will be re-assigned to it; and subsequently, using the task completion module 140, starts completing the selected tasks in accordance with the task completion instructions saved in the database 105.

In some embodiments, the operable Node 1 of the cluster can assign some of its tasks to another operable node 2 of the cluster. This action is necessary if Node 1 is operable but the resources available to it are insufficient for correct completion of the task. Re-assignment of a task can be done using the above-described mechanisms, and also taking into account the description in connection with FIG. 4. Also, in other embodiments, Node 2 can be selected arbitrarily from a list of operable cluster nodes. To exclude possible cyclical re-assignment of a task in the case if the cluster does not have a node able to complete the task, a list of nodes which could not complete the task is associated with the task. In this case, such list is reset, or re-initialized, in case of successful completion of the task.

In individual embodiments of the invention, Node 1 can also deny completion of a task if there are no resources required for its completion without direct re-assignment of the task. In this case, Node 1 resets the field in the database 105 which matches the information on the executor of the task. The executor of such task will be determined at subsequent iterations using the task list building module 125.

Therefore, embodiments of the invention facilitate completion tasks reliably, i.e., in fail-safe mode, and reduces the number and frequency of network interactions during the determination of cluster node operability status.

Figure 2:
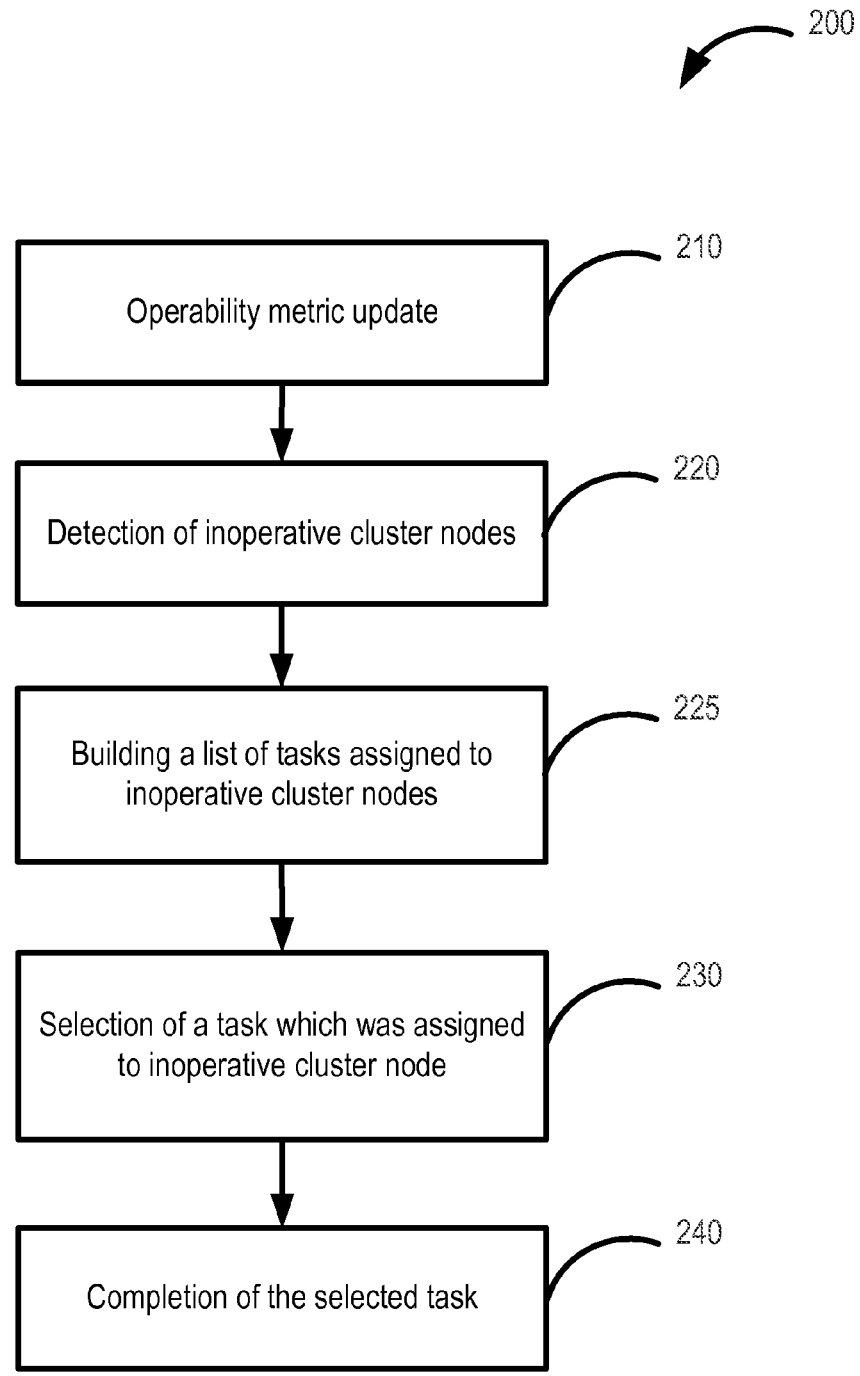
FIG. 2 illustrates an exemplary method for reliable completion of tasks, which could be implemented using the system shown in FIG. 1 according to one embodiment.

FIG. 2 illustrates an exemplary method 200 for reliable completion of tasks on schedule in distributed environments, realized using the system 100. It should be noted that there are various embodiments for the method; in particular, the steps described below can be completed on a stand-alone device or a group of devices executing suitable software instructions on a processor system, or using a firmware complex.

At block 210, the operability metric ("the metric") is updated using the operability metric update module 110. The operability metric update process is described above in more detail, in the description of the modes of operation of the operability metric update module 110.

It should be noted that, in certain embodiments, all operations constituting the exemplary method are completed on the particular cluster node.

Block 220 determines the inoperative nodes using the inoperative node detection module 120. This action can be performed as described above, e.g., by comparing the maximum operability metric for the cluster with the operability metrics of at least one cluster node. If the difference between the current operability metric of a node and the maximum operability metric for the cluster exceeds the preset (first) threshold value, then the node is considered to be inoperative. The database 105 can save information on the cluster node operability status, to be used at further stages.

Figure 3:
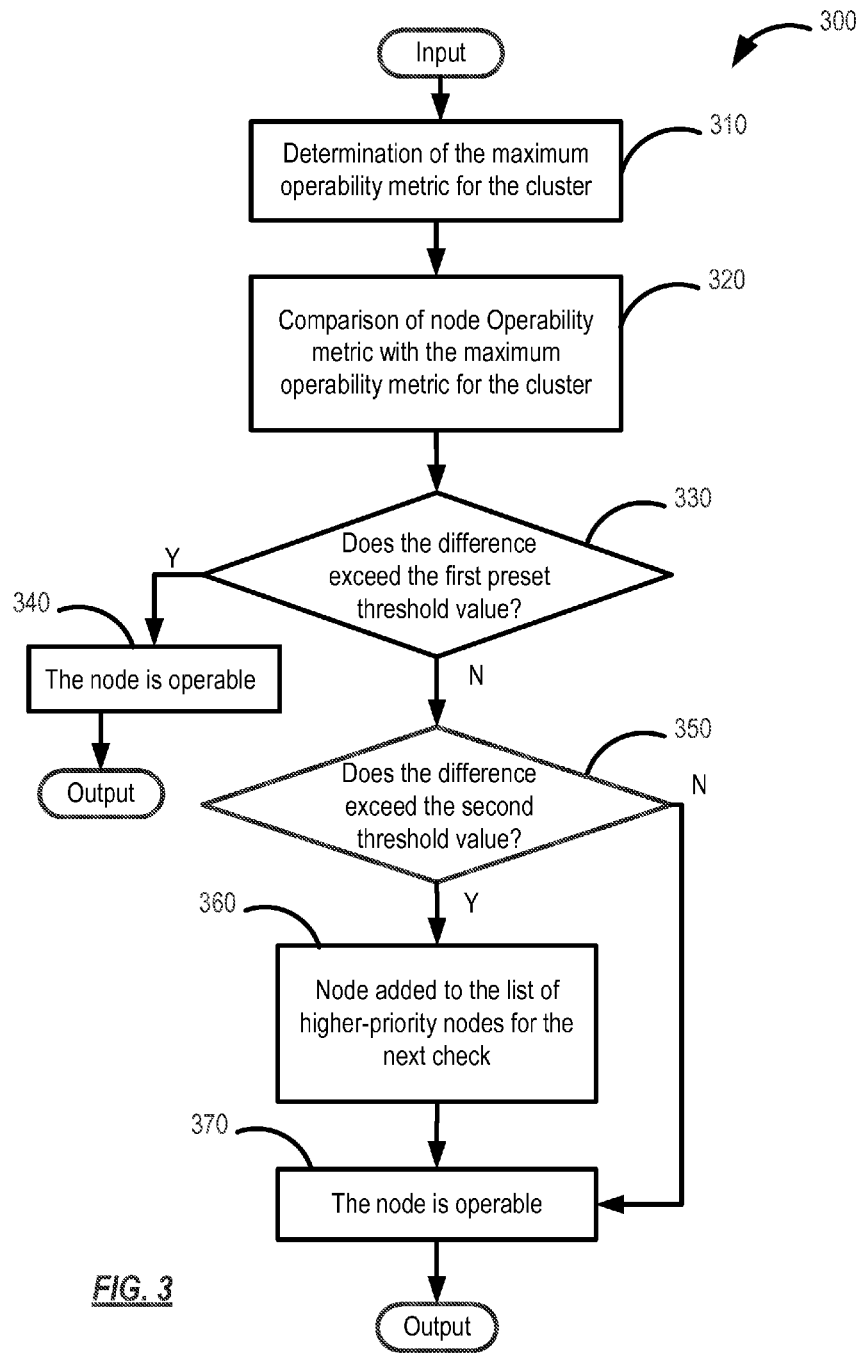
FIG. 3 illustrates a technique for detecting inoperative cluster nodes according to one embodiment.

A method for detecting inoperative cluster nodes according to one embodiment is illustrated in more detail in FIG. 3. It should be noted that, in some embodiments, the updated metric of the cluster node can be used as the maximum operability metric. Various approaches to the execution of this step are similar to the ones described above in the discussion of the operation options of the inoperative node detection module 120.

Upon determination of the inoperative nodes at block 225 using the module 125, a list is built of the tasks assigned to the inoperative cluster nodes. The complete list of tasks for the cluster with information on executors and on the completion frequency is stored in the database 105. This list is built, for example, using standard mechanisms for today's database management systems, such as Oracle 11g, Microsoft SQL Server 2008, and the like.

In order to store information on cluster node operability metrics, it is sufficient to ensure the possibility of writing in a database field simultaneously with the operation of reading from that field; in this case, it is allowable not to specify the result of simultaneous writing into the same field. At the same time, in order to store information on tasks, cluster node parameters and other supplementary data, it may be beneficial to use relational database management systems. Therefore, in some embodiments operability metrics information is stored in a different database than the one that contains data on the tasks and cluster node parameters. At 230, the task selection module 130 selects at least one task from the already-built list.

The selection of the task can be realized using various approaches. In particular, a number of factors can be taken into account—for example, the task's priority, the resources required to complete the task, the estimated time for completing the task on a computer with similar configuration, and so on. An exemplary task selection mechanism is described in more detail in connection with FIG. 4.

At 240, using the task completion module 140, completion of the selection tasks is performed. In order to determine the sequence of the actions when completing a task, a descriptor is saved in the database 105, which the task completion module 140 uses to determine how to perform an action. The above action is described above in more detail, with reference to the task completion module 140.

In another embodiment of system 100, each cluster node periodically updates its operability metric using the operability metric update module 110 and saves it in the database 105, which can be accessed by all cluster nodes; then it determines the inoperative nodes using the inoperative node detection module 120 based on cluster node operability metric values and on the maximum operability metric for the cluster; then, it finds the tasks that must be completed by the inoperative cluster nodes, using the task list building module, and, using the task selection module 130, selects the tasks which will be re-assigned to it; and subsequently, using the task completion module 140, starts completing the selected tasks in accordance with the task completion instructions saved in the database 105.

FIG. 3 illustrates a method 300 for determining inoperative cluster nodes using operability metrics according to one embodiment. Block 310 determines the maximum operability metric for the cluster. Then, block 320 compares the determined maximum metric with the same metric for each cluster node. Block 330 assesses the difference between the maximum operability metric for the cluster and the operability metric of some cluster node. If the difference between the metrics exceeds the preset first threshold value, the node is considered operable at 340. Otherwise, if the difference does not exceed the first threshold value but exceeds the second threshold value at 350, the node is considered to be in a borderline state and it is appropriate to add it, at block 360, to the list of higher-priority nodes for the subsequent detection of inoperative nodes. Therefore, the next check iteration will consider the metrics of higher-priority nodes.

A full operability check of all cluster nodes can be performed periodically. In one such embodiment, the period is divisible by the difference between the first and the second threshold values and by the operability metric update period. Once a node is added to the list of higher-priority nodes for the next check, the node is considered operable at 370. A node is also considered operable at step 370 if the difference does not exceed the first or the second threshold value. The next check of the cluster nodes operability status checks the status of the nodes which were previously added to the list of nodes with higher priority. Therefore, if the list does not include inoperative nodes, the other nodes are either operable or their inoperability is not critical at this stage.

Some embodiments do not include blocks 350 and 360, i.e. the difference is compared only with the first threshold value, and the operability conclusion is made if the difference does not exceed the preset first threshold value.

Figure 4:
FIG. 4 illustrates an exemplary process of selecting a task for completion according to one embodiment.

FIG. 4 illustrates an example of selection of a task or group of tasks which are assigned to currently inoperative cluster nodes and which need to be re-distributed between the operable nodes according to one embodiment. Various approaches can be used to select a task or a group of tasks. In some embodiments, all tasks of one of the inoperative nodes are re-assigned to an operable node which was the first to detect the inoperative state of a node. In other embodiments, the tasks are selected one-by-one in an arbitrary order. In other individual embodiments of the invention, the tasks are selected based on various parameters 400, as shown in FIG. 4, for example, taking into account the degree of use of computer resources and communication channels during the completion of a task, the estimated completion time, the priority, and so on.

For the selection of a task taking into account multiple parameters, the information on the tasks can be saved in the database in the form shown in FIG. 4. The value of the parameters for the task can be obtained using expert assessments or using statistical data analysis. In an individual embodiment, the parameter values are linguistic variables; a fuzzy logic system can be used for higher-quality selection of a task.

The characteristics of the network node itself are also assessed in order to determine what specific tasks can be completed by that cluster element. It should be noted that, due to the relatively constant configuration of cluster elements, computer characteristics data can be also saved in the database, in order to ensure speedy selection of a task. In particular, for the cluster nodes, parameters similar to the values for the task are assessed. For example, in accordance with FIG. 4, the following can be considered as parameters for cluster nodes: the throughput of the communication channel, the degree of computer resource load, and so on. The proposed fuzzy logic system involves three stages:

(1) Fuzzyfication: introduction of fuzziness. In order to complete this operation, linguistic variables are determined for all input values; term sets are built for each linguistic variable; membership functions are built for each term. For example, for the linguistic variable "computer resource usage rate", the term set will look like {"low", "below average", "average", "above average", "high"}, which allows to avoid a large quantity of numbers and various dimensions for different types of parameters. It should be noted that, when fuzziness is introduced for similar parameters—for example, the degree of communication channel usage (for a task) and communication channel throughput (for a cluster node), the membership function must take into account the uniformity of the values under consideration.

(2) Creation and use of a fuzzy knowledge base. A fuzzy knowledge base consists of product rules in the following form: IF<hypothesis of rule>THEN <conclusion of rule>. For example, the following rule may be used: "IF computer resource usage rate exceeds computer resource load rate, THEN the task cannot be completed on this cluster node". Building such rules is usually not difficult, because they are clear and are a kind of "verbal encoding". Similar rules are built for all parameters of the task.

(3) Defuzzyfication: obtaining a clear result at the output, reflecting, in this case, the information on what tasks from the list will be completed on the cluster node.

Figure 5:
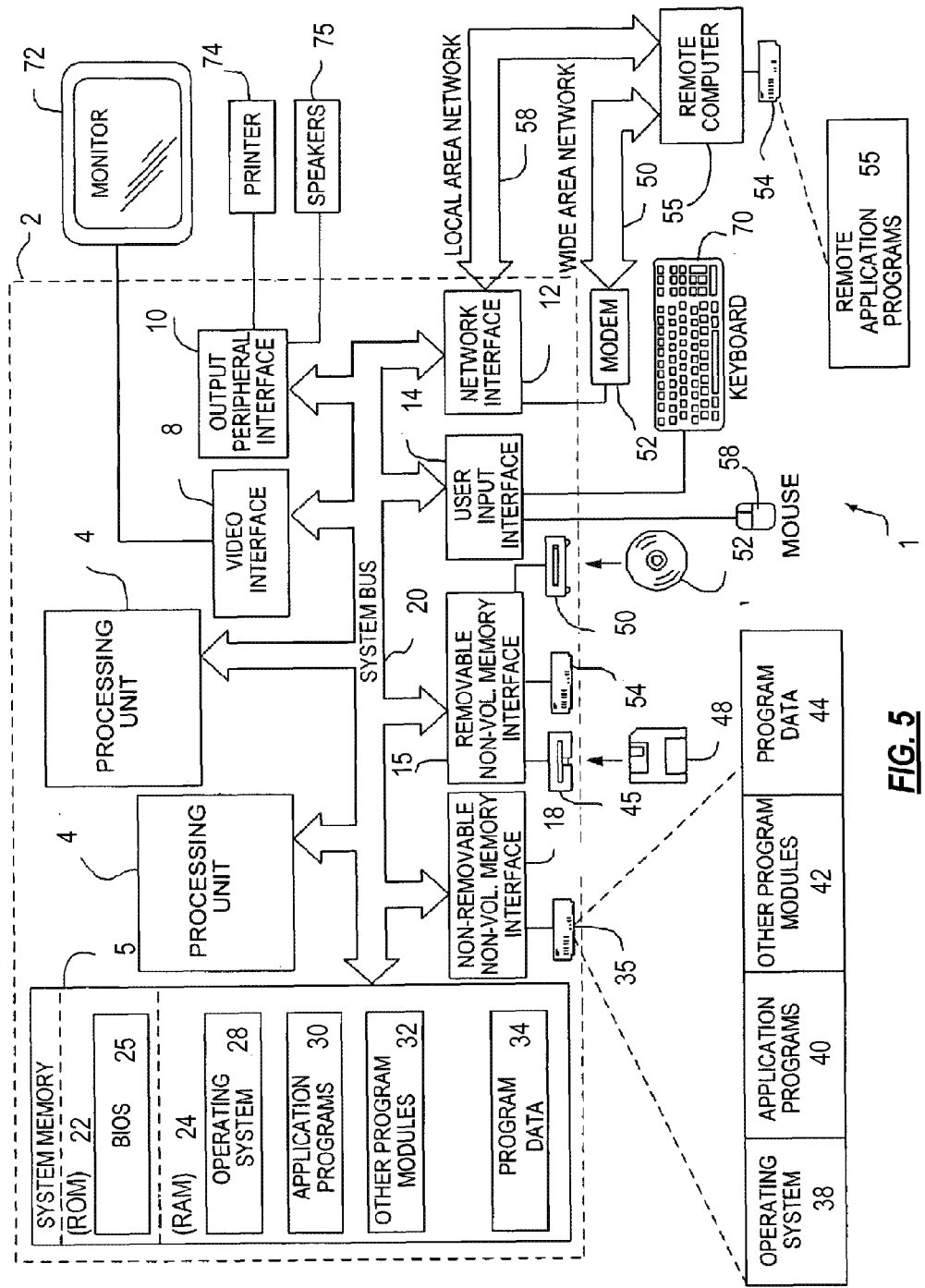
FIG. 5 is a block diagram illustrating an example of a general-purpose computer system on which aspects of the invention may be carried out.

FIG. 5 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a cluster computing system that includes a plurality of distinct cluster nodes, each including a set of computing hardware and an operating system, a method for reliable task execution, the method comprising:
    periodically performing token operations by each of the cluster nodes, wherein each token operation updates an operability metric corresponding to that cluster node, and wherein an effectiveness of the update of the operability metric is indicative of timeliness of task execution by that cluster node;
    in response to completion of the token operation, updating, by each of the cluster nodes, a database containing operability metrics for a plurality of cluster nodes to include each updated operability metric in the database;
    comparing, by each of the cluster nodes, at least some of the updated operability metrics stored in the database against a benchmark value, wherein the benchmark value is determined from operability metrics stored in the database;
    in response to the comparing, generating an operability determination, by each of the cluster nodes, as to whether one or more other cluster node is inoperative for carrying out tasks;
    in response to the operability determination being indicative of the one or more other cluster nodes being inoperative, selecting, by a first one of the cluster nodes, at least one task assigned to the one or more inoperative cluster node; and
    executing the at least one task by the first one of the cluster nodes in lieu of the one or more inoperative cluster nodes.

2. The method claim 1, wherein performing the token operations by each of the cluster nodes includes incrementing a counter value.

3. The method claim 1, wherein the database is distributed to a plurality of the cluster nodes.

4. The method claim 1, wherein the benchmark value is a maximum operability metric value from among the operability metric values stored in the database.

5. The method claim 1, wherein the benchmark value is a statistically-determined value from among the operability metric values stored in the database.

6. The method claim 1, wherein in comparing the updated operability metrics, each of the cluster nodes compares the updated operability metric value for each of a plurality of other cluster nodes against the benchmark value.

7. The method claim 1, wherein comparing the updated operability metrics is performed in response to completion of the token operation.

8. The method claim 1, wherein in generating the operability determination, each of the cluster nodes compares a result of the comparing of said at least some of the updated operability metrics stored in the database against the benchmark value, against a first threshold, and wherein in response to the first threshold being exceeded for any given cluster node, that cluster node is deemed inoperative.

9. The method claim 8, wherein in generating the operability determination, each of the cluster nodes compares a result of the comparing of said at least some of the updated operability metrics stored in the database against the benchmark value, against an intermediate threshold and, wherein in response to the first threshold not being exceeded but the intermediate threshold being exceeded for any given cluster node, that cluster node is marked for priority operability determination in a subsequent operability determination cycle.

10. The method claim 1, further comprising:
    adjusting, by each of the cluster nodes, a period for performing the token operations, wherein the period is based on a determined duration for executing a task.

11. The method claim 1, wherein in selecting the at least one task assigned to the one or more inoperative cluster node, the selection is based on at least one task parameter selected from the group consisting of: a priority of the task, resources required to complete the task, estimated time for completing the task on a computer with similar configuration, or any combination thereof.

12. An improved cluster computing system that includes a plurality of distinct cluster nodes, each including a set of computing hardware and an operating system, the improvement comprising:
    instructions executable on the computing hardware of each cluster node and stored in a non-transitory storage medium that, when executed, cause the computing hardware of the corresponding cluster node to implement:
        an operability metric update module that periodically performs token operations, wherein each token operation updates an operability metric corresponding to the cluster node, and in response to completion of the token operation, updates a database containing operability metrics for the cluster node and for a plurality of other cluster nodes to include each updated operability metric in the database, wherein an effectiveness of the update of the operability metric is indicative of timeliness of task execution by the cluster node;
        an inoperative node detection module that performs a comparison of at least some of the updated operability metrics stored in the database against a benchmark value, wherein the benchmark value is determined from operability metrics stored in the database, and that generates an operability determination as to whether one or more of the other cluster nodes is inoperative for carrying out tasks based on a result of the comparison;

a task selection module that selects at least one task assigned to the one or more inoperative cluster node in response to the operability determination being indicative of the one or more other cluster node being inoperative, and a task completion module that executes the at least one task in lieu of the one or more inoperative cluster nodes.

13. The system claim 12, wherein each of the token operations includes incrementing a counter value.

14. The system claim 12, wherein the database is maintained by a plurality of cluster nodes of the cluster computing system.

15. The system claim 12, wherein the benchmark value is a maximum operability metric value from among the operability metric values stored in the database.

16. The system claim 12, wherein the benchmark value is a statistically-determined value from among the operability metric values stored in the database.

17. The system claim 12, wherein the inoperative node detection module compares the updated operability metric value for each of the other cluster nodes against the benchmark value.

18. The system claim 12, wherein the inoperative node detection module generates the operability determination by comparing a result of the comparison of said at least some of the updated operability metrics stored in the database against the benchmark value, against a first threshold, and wherein in response to the first threshold being exceeded for any given cluster node, that cluster node is deemed inoperative.

19. The system claim 18, wherein the inoperative node detection module generates the operability determination by comparing a result of the comparison of said at least some of the updated operability metrics stored in the database against the benchmark value, against an intermediate threshold and, wherein in response to the first threshold not being exceeded but the intermediate threshold being exceeded for any given cluster node, that cluster node is marked for priority operability determination in a subsequent operability determination cycle.

20. The system claim 12, wherein the instructions executable on the computing hardware of each cluster node, when executed, cause the computing hardware to adjust a period for performing the token operations, wherein the period is based on a determined duration for executing a task.

21. The system claim 12, wherein the task selection module bases the selection on at least one task parameter selected from the group consisting of: a priority of the task, resources required to complete the task, estimated time for completing the task on a computer with similar configuration, or any combination thereof.

* * * * *